(No Model.)
H. B. GIBSON.
FISHING REEL.
No. 371,055. Patented Oct. 4, 1887.
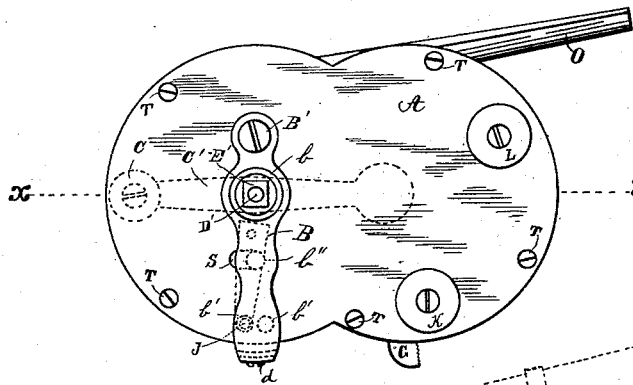
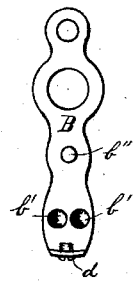
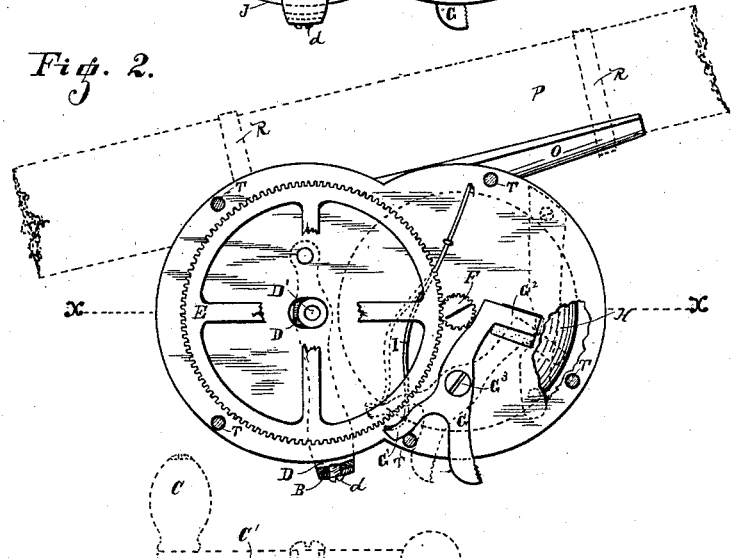
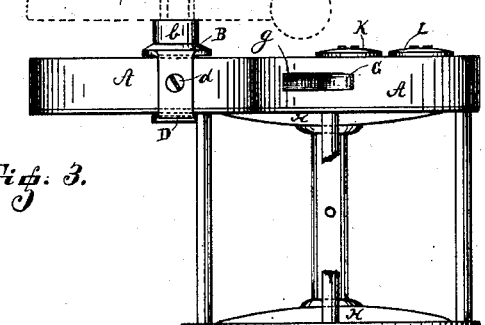
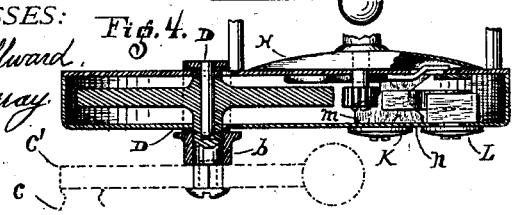
WITNESSES:
Frank Millward
Mary L. Murray
INVENTOR
H. B. Gibson
By Geo J Murray
his ATTORNEY

UNITED STATES PATENT OFFICE.

HENRY B. GIBSON, OF CINCINNATI, OHIO.

FISHING-REEL.

SPECIFICATION forming part of Letters Patent No. 371,055, dated October 4, 1887.

Application filed August 9, 1887. Serial No. 246,485. (No model.)

*To all whom it may concern:*

Be it known that I, HENRY B. GIBSON, a citizen of the United States, and a resident of Cincinnati, in the county of Hamilton and State of Ohio, have invented certain new and useful Improvements in Fishing-Reels, of which the following is a specification.

My invention relates to fishing-reels. Its objects are an absolutely free movement of the reel, so that in casting the bait may be thrown to any distance required, and in connection therewith a ready means for rapidly and positively stopping the reel so soon as the bait strikes the water, so that all backlashing or unwinding or tangling of the line is prevented. A further object is to readily connect or disconnect the motor-wheel, its actuating-crank, and the reel; and, further, to rapidly wind up the line when desired. The means I have provided for accomplishing these results will be first fully described in connection with the accompanying drawings, and then particularly referred to and pointed out in the claims.

Referring to the drawings, in which like parts are indicated by similar reference letters wherever they occur throughout the various views, Figure 1 is a side elevation of a reel embodying my improvements. Fig. 2 is a similar view with the side or cap and its attachments removed. In this view the rod is shown in dotted line. Fig. 3 is an edge elevation, looking beneath. In these views it is assumed that the reel is attached for use upon the under side of the rod. Fig. 4 is a longitudinal transverse section of the device taken through line $x\,x$, Fig. 2. Fig. 5 is an inside elevation of one arm of the swing-yoke in which the arbor of the driving-pinion has its bearings.

A is a sheet-metal shell incasing the mechanism for operating the reel, and B is a yoke formed in two parts to embrace the shell. It is pivoted upon opposite sides of the shell upon bolts B′, which pass through the ends of the yoke and are tapped into the opposite sides of the case A. The yoke B is perforated to receive the bearing D of the journal or shaft of the driving-wheel E. One side of the yoke has an inwardly-projecting pin, $b''$, which passes through a perforation, S, in the shell to engage a spring-latch which has a pin projecting from its end through the shell to enter the perforations $b'$ in the yoke and retain it in either its forward or rear position.

The object of journaling the driving-wheel E in the swinging yoke is to rapidly throw it into or out of engagement with the pinion F, which is secured upon the shaft of the line-spool H. Thus in making a cast the spool is entirely disconnected from its driving mechanism, including the crank C′ and handle C.

For the purpose of instantly stopping the reel and preventing the unwinding or tangling of the line so soon as the bait strikes the water I have provided the brake G, which is pivoted upon the bolt $G^3$. The inner angular arm, $G^2$, of the brake-lever projects through the inner cap of the end A in a position to be brought against the flanged rim of the spool end when drawn to the position shown in dotted line, Fig. 2, by the index-finger acting upon the arm of the lever which projects through a slot in the edge or rim of the case. A spring, I, throws the lever back and releases the spool when the projecting arm of the lever is released.

K is the sliding button to which the wedge $m$ is attached for releasing the drag, and L is the slide which carries the customary click-spring, $n$, the end of which is pushed by the button L against the teeth of pinion F to give an alarm when desired. The hub of the driving-wheel E projects some distance outside of the case and has its end angular to receive the handle-lever C′, which is held by a screw which presses the handle-lever against nut $b$, passed over the projecting end of the hub.

The divided case A consists of two parts, one part consisting of one side and the rim and the other of the side alone. The two parts are united by bolts or screws T, which pass through one side of the case and are tapped into the opposite side.

The fishing-rod (represented in dotted line, Fig. 2) is indicated by P, and R represents the rings which secure the reel-plate O to the pole or rod.

It is obvious that the stop-lever G and its connections may be dispensed with and the advantage of the free-running spool still obtained, but not so conveniently, by using the finger as a stop.

What I claim is—

1. The combination of the case A, the line-spool, and pinion D, secured upon its journal, the swinging yoke B, passing around the case, its pivot B', the driving-wheel E, having its shaft passing through the case and its bearings in the swinging yoke, and a spring-latch to retain the yoke in either position, so that the wheel E may be held in or out of engagement with the spool-pinion, substantially as shown and described.

2. In a fishing-reel, the combination of a line-spool having a pinion upon its axis, a driving-wheel mounted in movable bearings and adapted to be connected with and disconnected from said spool-axis, a spring-latch to retain the said driving-wheel in either the connected or disconnected position, and a stop mechanism, as lever G $G^2$, to stop the spool, whether connected with or disconnected from its driving-wheel, substantially as shown and described.

3. The combination, substantially as specified, of the case A, the spool H, mounted in said case, the driving-wheel E and its bearing D, and the pivoted bearing-yoke B for swinging the said driving-wheel into and out of engagement with the spool-pinion, for the purpose set forth.

4. In a fishing-reel, the combination, as specified, of case A, spool H and its pinion D, the divided yoke B and its pivot B', the driving-wheel E, mounted in said swinging yoke, and the stop-lever G $G^2$ and its pivot $G^3$, the arm of said lever projecting through the rim of said case in proximity to the said yoke end, for the purpose set forth.

HENRY B. GIBSON.

Witnesses:
FRANK L. MILLWARD,
GEO. J. MURRAY.